Sept. 7, 1965 J. S. CUBERT 3,205,445
READ OUT CIRCUIT COMPRISING CROSS-COUPLED
SCHMITT TRIGGER CIRCUITS
Filed July 5, 1962 2 Sheets-Sheet 1

INVENTOR
JACK S. CUBERT

BY Edward M. Farrell

ATTORNEY

Sept. 7, 1965 J. S. CUBERT 3,205,445

READ OUT CIRCUIT COMPRISING CROSS-COUPLED SCHMITT TRIGGER CIRCUITS

Filed July 5, 1962 2 Sheets-Sheet 2

United States Patent Office 3,205,445

Patented Sept. 7, 1965

3,205,445

READ OUT CIRCUIT COMPRISING CROSS-COUPLED SCHMITT TRIGGER CIRCUITS

Jack S. Cubert, Willow Grove, Pa., assignor to Sperry Rand Corporation, New York, N.Y., a corporation of Delaware Filed July 5, 1962, Ser. No. 207,507
5 Claims. (Cl. 328—150)

This invention relates to a read out circuit in a magnetic recording system, and more particularly to a circuit for detecting zero crossings of low level electrical input signals.

In a magnetic recording system, signals read from a magnetic recording medium, such as a tape, are generally in a form of sine waves. The direction of the sine waves at a particular time is generally indicative of a "1" or a "0" bit of information. Such a system is a phase modulation system which offer numerous advantages over other types of systems which involve time intervals between information.

These sine wave signals read from the magnetic tape are generally applied to bi-stable circuits, commonly referred to as Schmitt trigger circuits, which produce substantially square wave electrical signals. The square wave electrical signals, in turn, are used to produce pulse signals for each change in direction of the square wave signals. These pulse signals represent "1" and "0" bits of information. In addition, the pulses may represent non-significant or spurious signals which are generally eliminated prior to passing the pulse signals to subsequent utilization circuits.

Generally Schmitt trigger circuits must have input signals exceeding some predetermined amplitude in order to change operating states. These input signals may be considered as the "turn on" signals. In order for the Schmitt trigger circuit to switch back to its original operating state after it has been turned on, the applied "turn off" signal must generally be of much higher amplitude than the "turn on" signal. The difference between the "turn on" and "turn off" potentials is the well known hysteresis effect.

In a magnetic recording system, when very low level signals are applied to the input circuit of a Schmitt trigger circuit, the signals may be of sufficient amplitude to act as a turn on signal to switch the Schmitt trigger circuit from a first to a second operating state, but the same level signal may not be of sufficient amplitude to act as a turn off signal to switch the Schmitt trigger circuit back to its original state. Consequently, in systems involving low level signals, the hysteresis effect found in Schmitt trigger circuits becomes a serious problem.

It is an object of this invention to provide an improved read out circuit for a magnetic recording system in which the hysteresis effect in a bi-stable circuit is minimized.

It is a further object of this invention to provide an improved read out circuit responsive to very low level information signals.

In accordance with the present invention, a zero crossing detector circuit includes a pair of bi-stable circuits. Input signals are applied to the input circuit of both bi-stable circuits. Means are provided for coupling the output circuits of each of the bi-stable circuits to the respective input circuits of the other.

Other objects and advantages of the present invention will be apparent and suggest themselves to those skilled in the art, from a reading of the following specification and claims in conjunction with the accompanying drawing, in which:

Figure 1:
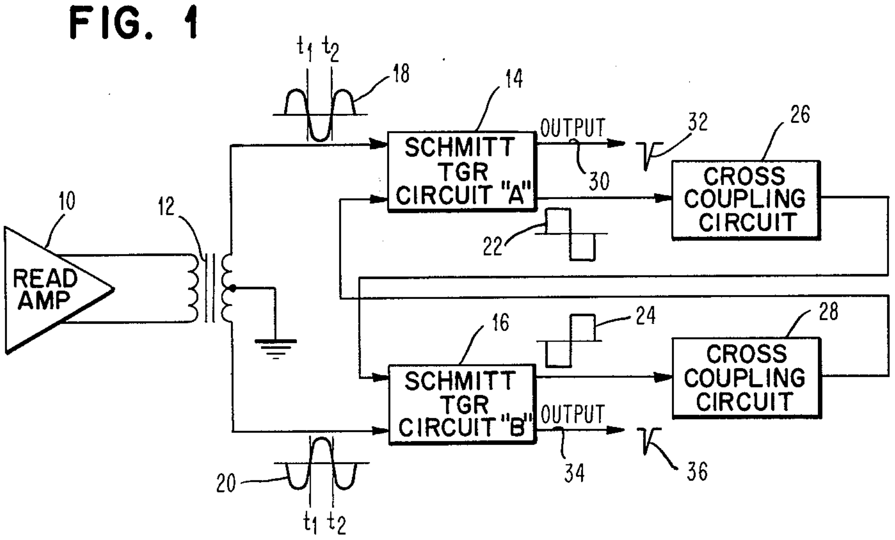
FIGURE 1 is a block diagram illustrating a read out circuit, in accordance with the present invention.

Referring particularly to FIGURE 1, input signals from a recording head (not illustrated) are applied from a read amplifier 10 through a transformer 12 to a pair of Schmitt trigger circuits 14 and 16. These input signals are illustrated by a pair of sine wave signals 18 and 20.

The square wave signals generated by the Schmitt trigger circuits 14 and 16 are illustrated by the wave forms 22 and 24, respectively. The output signals, in the form of pulses, are applied to a pair of cross coupling circuits 26 and 28, respectively. It is noted that the output circuit of the one Schmitt trigger circuit is applied to the input circuit of the other Schmitt trigger circuit, and vice versa.

The Schmitt trigger circuit 14 is also connected to an output terminal 30, at which is developed a negative pulse signal 32. Likewise, the Schmitt trigger circuit 16 is also connected to an output terminal 34, at which is developed a negative pulse signal 36.

The negative pulse signals 32 and 36 are produced each time that the signals 22 and 24 change direction. These pulse signals 32 and 36 actually represent information and may also include spurious pulse signals. These signals may be applied to a subsequent utilization circuit, such as a three quarter delay flop, which may be used to eliminate the spurious pulse signals prior to passing the information signals to subsequent circuits. An example of a utilization circuit to which the output terminals 30 or 34 may be connected is described in a co-pending application of Herbert Frazer Welsh, entitled "Phase Modulation Read System," filed December 6, 1960, serial number 74,112, and assigned to the same assignee of the present invention.

It is noted that the input signals 18 and 20 are 180° out of phase with respect to each other. Likewise, the signals 22 and 24 are also 180° out of phase with respect to each other. The output signals 22 and 24, generated by the Schmitt trigger circuits, are converted to pulse signals in a manner to be described. These pulse signals are used to implement the input signals 18 and 20 to minimize the hysteresis effect.

The circuits involved in the Schmitt trigger circuit 14 and the cross coupling circuit 26 are substantially similar to the circuits involved in the Schmit trigger circuit 16 and the cross coupling circuit 28. Consequently, only one such circuit will be described in connection with FIGURE 2. It is understood that the circuit in FIGURE 2 would be duplicated in reproducing the system of FIGURE 1.

Figure 2:
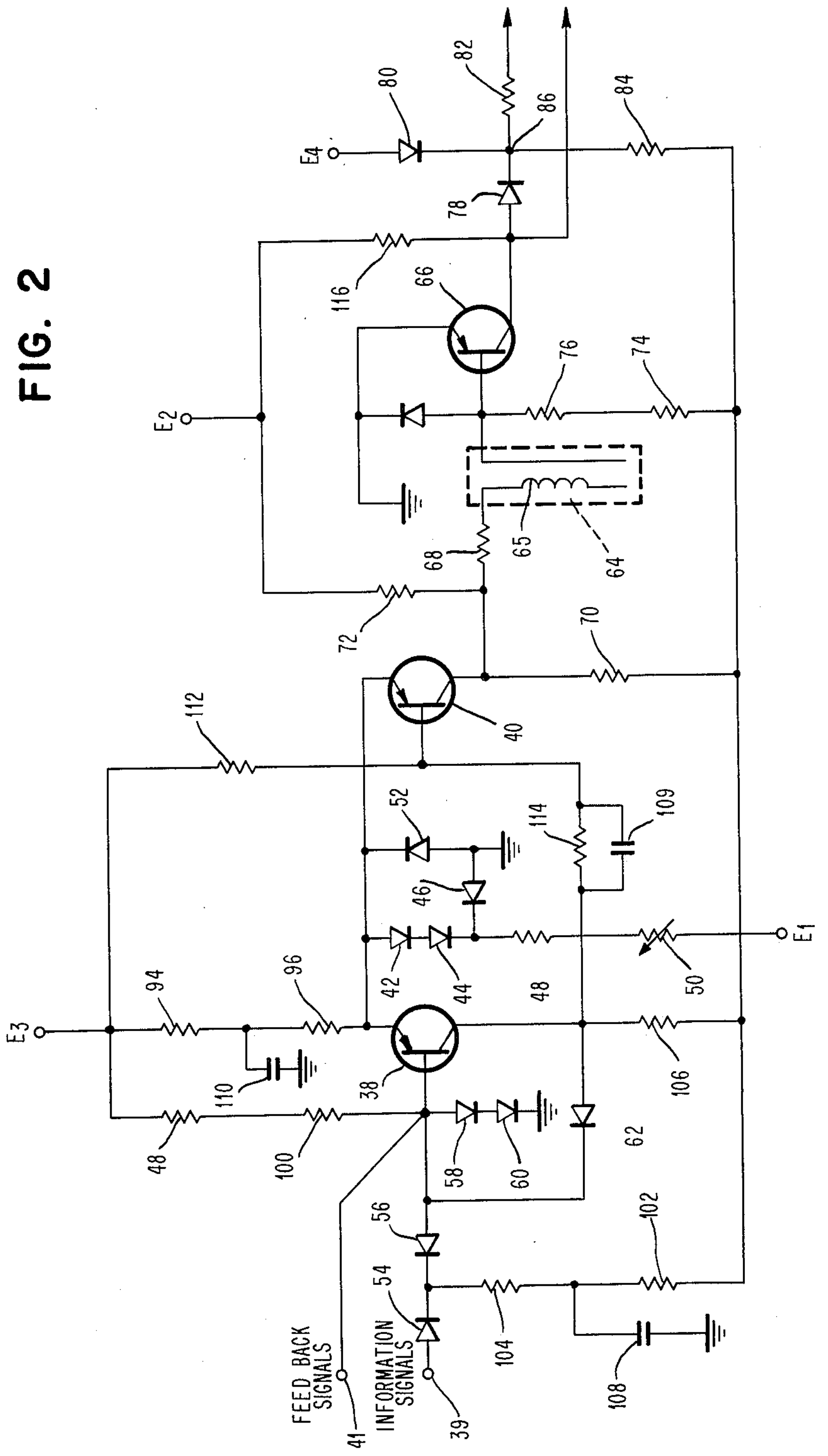
FIGURE 2 is a schematic diagram illustrating in detail circuits employed in FIGURE 1.

Referring particularly to FIGURE 2, a circuit somewhat similar to a conventional Schmitt trigger circuit includes a pair of transistors 38 and 40. During normal operation, when the transistor 38 is conducting, the transistor 40 is non-conducting, and vice versa. Information signals are applied to input terminal 39 with the fed back signals being applied to the input terminal 41. Both signals are applied to the base of the transistor 38.

When the transistor 38 is conducting, its emitter voltage is determined by a biasing network comprising diodes 42, 44 and 46, along with resistors 48 and 50. Resistor 50 is made variable to control the point at which the transistor 38 will begin to turn off.

The forward drop across a diode 52 controls the voltage at the emitter of the transistor 38 when the transistor 38 is off and the transistor 40 is on. Therefore, the diode 52 controls the point at which the transistor 38 turns on. The difference in "turn on" and "turn off" potentials is the well known hysteresis effect, as previously mentioned.

Diodes 54 and 56 effectively decouple the input signal from the base of the transistor 38 to allow for large positive and negative voltage excursions. Diodes 58 and 60 limit the reverse base bias voltage. Diode 62 reduces the delay in the input circuit by holding the transistor 38 on the edge of saturation through non-linear feed back.

As previously mentioned, the transistors 38 and 40 may comprise a somewhat conventional Schmitt trigger circuit in which a square wave signal is produced. The diode 62 provides a feedback path from the collector to the base of the transistor 38 to produce a regenerative action to cause a sudden switching of the transistor 38 from one state to another. The transistor 40, having its base connected to the collector of the transistor 38, switches operating states whenever the transistor 38 switches operating states. The various electrodes of the transistors 38 and 40 are coupled in such a manner to provide regenerative feedback so that both transistors are in opposite states of operation. The square wave signal produced by the transistors 38 and 40 is now applied to a pulse generating output circuit.

The pulse generating output circuit relies on the fact that the input terminal of an open circuited delay line acts as a resistor of the value of a characteristic impedance of which is the electrical length of the line following a step input.

As the transistor 38 is turned off, the transistor 40 is driven into saturation causing a positive voltage step at the collector of the transistor 40 which acts as the input to the delay line 64, which includes an inductor 65. This positive step will feed current into the base of a transistor 66.

Since the transistor 66 is biased into saturation quiescently this positive current step will cut off the transistor 66 and produce a negative output signal at its collector. When the transistor 40 is turned off, the negative step will cause more base current in the transistor 66 and the operation of the transistor 66 will not be affected.

Resistors 68, 70 and 72 terminate the delay line to avoid secondary reflections. The resistors 74 and 76 control the current bias on the transistor 66. By varying the bias of the transistor 66, a pulse width developed by the delay line 64 may be varied if necessary. Diode 78 is used to maintain a low impedance at the base of the transistor 66 when this transistor is cut off.

Still considering FIGURE 2, along with FIGURE 1, the Schmitt trigger circuits 14 and 16 receive input signals which are 180° out of phase with respect to each other. Each side provides an output pulse when its input is positive going. A negative pulse is produced for each zero cross over point of the square wave signal, either positive or negative going. It is this later fact which is used in the present invention in order to detect signals with very low amplitude.

The output signal from one Schmitt trigger circuit is fed to the input of the other Schmitt trigger circuit, and vice versa. These fed back signals are used as resetting signals, thereby eliminating the dependence on the input signals, such as signals 18 and 20, for resetting.

At time $t_1$ (see input signal 18 in FIGURE 1), the Schmitt trigger circuit 16 triggers. Its output signal is fed back to the base of the transistor 38 (FIGURE 2) thereby turning it on. At time $t_2$ (see input signal 20 in FIGURE 1), the Schmitt trigger circuit 14 can again cut off.

The cross coupling network, illustrated in FIGURE 2, includes a diode 78, a diode 80, resistor 82 and resistor 84. When the transistor 66 cuts off, the diode 78 is essentially backed biased and the diode 80 determines the voltage at point 86 as minus 3.5 volts. In some cases, it is desired to eliminate the cross coupled signal and operate the Schmitt trigger circuits in a conventional manner, the point 86 may be returned to ground.

Figure 3A:
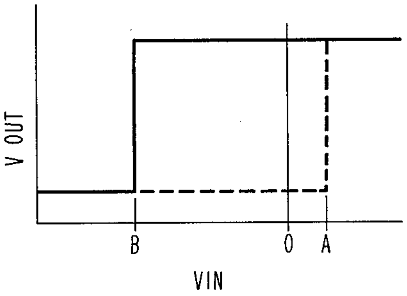
FIGURES 3A, 3B and 3C are wave forms shown for purposes of explaining the present invention.
Figure 3B:
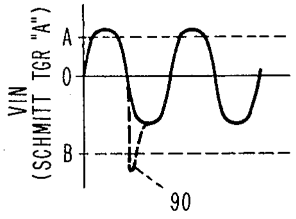
Figure 3C:
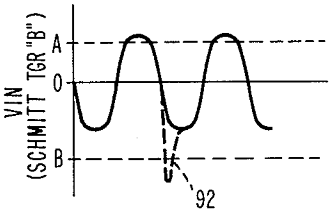

Referring to FIGURES 3*a*, 3*b* and 3*c*, FIGURE 3*a* represents a hysteresis loop, which normally would be associated with the Schmitt trigger circuits 14 or 16. If the normal operating point is at zero, the trigger points of the Schmitt trigger circuit may be considered as points A and B. If a positive input signal of relatively low amplitude is applied, the output voltage will switch to a high state as soon as the point A is exceeded. This may be considered as the on condition. However, in order to turn the Schmitt trigger circuit off, the input signal must now drop to point B. It is seen that the signal necessary to reset the Schmitt trigger circuit is much greater than the signal needed to set the Schmitt trigger circuit.

Referring to FIGURE 3*b*, the input signal to the Schmitt trigger circuit 14 is illustrated. When the input signal is of relatively low amplitude, it will not reach point B. However, as the signal applied to the Schmitt trigger circuit 14 is going negative a signal, such as 90, is applied to the input of the Schmitt trigger circuit 14 from the output circuit of the Schmitt trigger circuit 16. It is seen that the signal 90, is of relatively large amplitude and sufficient to drive the input circuit of the Schmitt trigger circuit 14 below point B thereby permitting it to reset despite the relatively low input signal.

A similar situation applies in connection with the Schmitt trigger circuit 16, with which FIGURE 3 is associated. In this case a signal 92 is applied to the Schmitt trigger circuit 16 from the output circuit of the Schmitt trigger circuit 14 to permit it to reset despite a low input negative signal.

By utilizing a feed back signal from one Schmitt trigger circuit to the other to implement the normal low level negative input signal, the effect of hysteresis is greatly minimized. This permits a read out circuit to handle relatively low level signals from a magnetic recording medium.

Various resistors such as resistors 94, 96, 98, 100, 102, 104 and 106, not specifically referred to previously, are provided to assure proper operating and biasing potentials for the transistor 38. Capacitors 108, 109 and 110 are bypass capacitors. Other resistors 112, 114 and 116 provide proper operating conditions for the transistors 40 and 61.

In the present invention involving two bi-stable circuits, it may be desirable to apply a "start up" signal to the system prior to the application of information signals. This assures the proper operating states of the two bi-stable circuits, i.e. assures that they are in opposite states when information is applied.

While it is understood that various values of voltages, resistors, capacitors, transistors, etc., may be varied in accordance with the exact operating conditions desired, the following values are given as an illustration of one form of the invention which was reduced to practice:

$E_1 = -11$ v.
$E_2 = -3.5$ v.
$E_3 = +12$ v.
$E_4 = -3.5$ v.
R104 and R102=10.1K ohms
R98 and R100=24.4K ohms
R106=2K ohms
R70=1.5K ohms
R114=.499K ohm
R112=10K ohms
R94 and 96=1.76K ohms
R72=.681K ohm
R68=1K ohm
R74=6.81K ohms
R76=2.21K ohms
R116=.75K ohm
R84=1.78 ohms
R82=1.5K ohms
R48=.576K ohm
R50=0 to 5K ohms
R of coil 65=1.5K ohms
All diodes except diode 46 are type XR25
Diode 46 is type EM99
All transistors are type 2N501

The embodiments of the invention in which an exclusive property or privilige is claimed are defined as follows:

1. A zero crossing detector circuit comprising a pair of Schmitt trigger circuits normally operative in synchronization and in opposite states with respect to each other and each having input and output circuits, said Schmitt trigger circuits being operative in a first or second state dependent upon the polarity of a signal applied to their input circuits, means for biasing said Schmitt trigger circuits at a point of reference potential, means for applying a sine wave information signal to the input circuits to trigger and set one of said Schmitt trigger circuits from a first state of operation to a second state when said information signal is positive with respect to said point of reference potential, means for applying a feed back reset signal from the output circuit of the other of said Schmitt trigger circuits to the input circuit of said one of said Schmitt trigger circuit to aid in resetting said one Schmitt trigger circuit when said sine wave information signal is negative with respect to said point of reference potential, and said reset signal also being negative with respect to said point of reference potential.

2. A zero crossing detector circuit comprising a pair of Schmitt trigger circuits normally operative in synchronization and in opposite states with respect to each other and each having input and output circuits, said Schmitt trigger circuits adapted to generate substantially square wave signals and being operative in a first or second state dependent upon the polarity of a signal applied to their input circuits, means for biasing said Schmitt trigger circuits at a point of reference potential, means for applying a sine wave information signal to the input circuits of said pair of Schmitt trigger circuits to trigger and set said Schmitt trigger circuits from a first state of operation to a second state when said information signal is positive with respect to said point of reference potential and to reset said Schmitt trigger circuits from said second state to said first state when said information signal is negative with respect to said point of reference potential, means for applying a feed back signal from the output circuit of said one of said Schmitt trigger circuits to the input circuit of the other of said Schmitt trigger circuits to implement the resetting of said other Schmitt trigger circuit when said sine wave information signal is negative with respect to said point of reference potential, and said reset signal also being negative with respect to said point of reference potential.

3. A zero crossing detector circuit comprising a pair of Schmitt trigger circuits normally operative in synchronization and in opposite states with respect to each other and each having input and output circuits, said Schmitt trigger circuits adapted to generate substantially square wave signals in the same phases as sine wave signals applied thereto and being operative in a first or second state dependent upon the polarity of a signal applied to their input circuits, means for biasing said Schmitt trigger circuits at a point of reference potential, means for applying a sine wave information signal to the input circuits to trigger and set said Schmitt trigger circuits from a first state of operation to a second state, when said information signal is positive with respect to said point of reference potential and to reset said Schmitt trigger circuits from said second state to said first state when said information signal is negative with respect to said point of reference potential, means for applying a feed back signal from the output circuit of one of said Schmitt trigger circuits to the input circuit of the other of said Schmitt trigger circuits to implement resetting said other Schmitt trigger circuit when said sine wave information signal is negative with respect to said point of reference potential, said reset signal also being negative with respect to said point of reference potential, a pulse generating circuit, and means for applying said square wave signals to said pulse generating circuit to produce a pulse signal for each change in direction of said square wave signals.

4. The invention as set forth in claim 3 wherein said pair of Schmitt trigger circuits are both cross coupled to each other by substantially similar cross coupling networks.

5. The invention as set forth in claim 4 wherein said feed back signal comprises a pulse signal.

References Cited by the Examiner

UNITED STATES PATENTS

| | | | |
|---|---|---|---|
| 2,773,983 | 12/56 | Baker et al. | 328—49 |
| 2,933,620 | 4/60 | Huang | 307—88.5 |
| 3,007,115 | 10/61 | Batley | 328—42 |
| 3,051,507 | 8/62 | Carroll | 328—206 |

DAVID J. GALVIN, *Primary Examiner.*

ARTHUR GAUSS, JOHN W. HUCKERT, *Examiners.*